(12) United States Patent
Mori et al.

(10) Patent No.: US 10,625,554 B2
(45) Date of Patent: Apr. 21, 2020

(54) VEHICLE SUSPENSION MEMBER

(71) Applicant: NHK SPRING CO., LTD., Yokohama-shi, Kanagawa (JP)

(72) Inventors: Mitsuo Mori, Yokohama (JP); Tatsuya Nishimura, Yokohama (JP); Masayoshi Tanaka, Yokohama (JP)

(73) Assignee: NHK SPRING CO., LTD., Kanagawa (JP)

( * ) Notice: Subject to any disclaimer, the term of this patent is extended or adjusted under 35 U.S.C. 154(b) by 152 days.

(21) Appl. No.: 15/445,718

(22) Filed: Feb. 28, 2017

(65) Prior Publication Data
US 2017/0174030 A1 Jun. 22, 2017

Related U.S. Application Data (63) Continuation of application No. PCT/JP2015/072518, filed on Aug. 7, 2015.

(30) Foreign Application Priority Data

Aug. 28, 2014 (JP) .................. 2014-174269
Mar. 2, 2015 (JP) .................. 2015-040128

(51) Int. Cl.
*F16F 1/04* (2006.01)
*B60G 11/14* (2006.01)
(Continued)

(52) U.S. Cl.
CPC ............ *B60G 11/14* (2013.01); *B60G 21/055* (2013.01); *C09D 127/18* (2013.01); *C09D 163/00* (2013.01); *F16F 1/024* (2013.01); *F16F 1/04* (2013.01); *F16F 1/14* (2013.01); *B05D 5/083* (2013.01); *B05D 7/14* (2013.01);
(Continued)

(58) Field of Classification Search
CPC .......... F16F 1/024; F16F 1/04; C09D 163/00; C09D 163/04; C09D 127/18
See application file for complete search history.

(56) References Cited

U.S. PATENT DOCUMENTS

| 5,898,043 A | 4/1999 | Uemae et al. |
| 5,939,195 A * | 8/1999 | Allen ................. B05D 7/534 428/413 |

(Continued)

FOREIGN PATENT DOCUMENTS

| EP | 0994141 A2 | 4/2000 |
| EP | 2060328 A2 | 5/2009 |

(Continued)

OTHER PUBLICATIONS

Machine translation of JP 2008-229518, retrieved Jan. 19, 2019 (Year: 2019).*

(Continued)

*Primary Examiner* — Bradley T King
(74) *Attorney, Agent, or Firm* — Holtz, Holtz & Volek PC (57) ABSTRACT

According to one embodiment, a vehicle suspension member includes a body of a vehicle suspension member made of a metal, a first layer provided to cover a surface of the body and a second layer provided to cover at least a portion of a surface of the first layer. The first layer includes an epoxy resin, and the second layer includes an epoxy resin and a fluororesin.

15 Claims, 5 Drawing Sheets

(51) Int. Cl.
    *C09D 163/00*     (2006.01)
    *F16F 1/02*     (2006.01)
    *C09D 127/18*     (2006.01)
    *B60G 21/055*     (2006.01)
    *F16F 1/14*     (2006.01)
    *C08K 3/04*     (2006.01)
    *C08K 3/26*     (2006.01)
    *B05D 5/08*     (2006.01)
    *B05D 7/00*     (2006.01)
    *B05D 7/14*     (2006.01)
    *C08K 3/22*     (2006.01)

(52) U.S. Cl.
    CPC ............ *B05D 7/54* (2013.01); *B60G 2206/73* (2013.01); *C08K 3/04* (2013.01); *C08K 2003/2241* (2013.01); *C08K 2003/265* (2013.01); *F16F 2224/025* (2013.01); *F16F 2230/40* (2013.01)

(56) References Cited

U.S. PATENT DOCUMENTS

| | | | |
|---|---|---|---|
| 5,981,086 A | 11/1999 | Siminski | |
| 6,346,292 B1 | 2/2002 | Grubb et al. | |
| 6,677,032 B1 | 1/2004 | Grubb et al. | |
| 8,574,708 B2 | 11/2013 | Cinoman et al. | |
| 8,647,745 B2 | 2/2014 | Lucas | |
| 2004/0101670 A1 | 5/2004 | Grubb et al. | |
| 2006/0252320 A1* | 11/2006 | Panse | B32B 5/028 442/38 |
| 2007/0116963 A1 | 5/2007 | Sakakibara | |
| 2008/0193743 A1* | 8/2008 | Kruse | C08K 3/08 428/332 |
| 2009/0110934 A1 | 4/2009 | Cinoman et al. | |
| 2009/0130304 A1 | 5/2009 | Muth et al. | |
| 2009/0270533 A1 | 10/2009 | Umehara et al. | |
| 2010/0297422 A1* | 11/2010 | Lucas | C09D 7/69 428/301.1 |
| 2011/0070376 A1* | 3/2011 | Wales | A01N 63/00 427/414 |
| 2013/0108785 A1 | 5/2013 | Okamoto et al. | |
| 2015/0024215 A1 | 1/2015 | Utsumi et al. | |
| 2016/0257845 A1* | 9/2016 | Park | C09D 163/00 |

FOREIGN PATENT DOCUMENTS

| | | |
|---|---|---|
| JP | 60003438 A | 1/1985 |
| JP | 11188309 A | 7/1999 |
| JP | 2005171297 A | 6/2005 |
| JP | 2007308067 A | 11/2007 |
| JP | 2008229518 A | 10/2008 |
| JP | 2009120812 A | 6/2009 |
| JP | 2011510147 A | 3/2011 |
| JP | 2011104988 A | 6/2011 |
| JP | 2011248023 A | 12/2011 |
| JP | 2012000530 A | 1/2012 |
| JP | 2014065268 A | 4/2014 |
| WO | 03093375 A1 | 11/2003 |
| WO | 2009092773 A1 | 7/2009 |
| WO | 2011048930 A1 | 4/2011 |
| WO | 2014013827 A1 | 1/2014 |

OTHER PUBLICATIONS

Lanco TF 1778 (Year: 2018).*
Japanese Office Action (and English language translation thereof) dated May 8, 2018 issued in counterpart Japanese Application No. 2015-040128.
Extended European Search Report (EESR) dated Apr. 5, 2018 issued in counterpart European Application No. 15836628.6.
International Search Report (ISR) and Written Opinion dated Sep. 15, 2015 issued in International Application No. PCT/JP2015/072518.

* cited by examiner

VEHICLE SUSPENSION MEMBER

CROSS REFERENCE TO RELATED APPLICATIONS

This application is a Continuation Application of PCT Application No. PCT/JP2015/072518, filed Aug. 7, 2015 and based upon and claiming the benefit of priority from prior Japanese Patent Applications No. 2014-174269, filed Aug. 28, 2014; and No. 2015-040128, filed Mar. 2, 2015, the entire contents of all of which are incorporated herein by reference.

BACKGROUND OF THE INVENTION

1. Field of the Invention

The present invention relates to a vehicle suspension member.

2. Description of the Related Art

Vehicles such as cars comprise a suspension mechanism. The suspension mechanism has a shock-absorbing function of suppressing propagation of unevenness of road surfaces to the vehicle body, a function of aligning the wheels and axle, and a function of pressing the wheels against road surfaces, thereby enabling to improve the riding comfort, operation stability and the like. The suspension mechanism comprises various suspension members such as coiled springs, a stabilizer bar and a plate spring.

The coiled spring is placed between a spring seat located at an upper portion of the spring and another spring seat located at a lower portion while being compressed by the weight of the vehicle, and expands/contracts according to the load.

The stabilizer bar provided in the suspension mechanism of a car comprises a torsion portion (twisted portion) extending along the width direction of the car, arm portions connected to respective ends of the torsion portion, and bend portions formed between the torsion portion and the arm portions, respectively. For example, the torsion portion is supported by the vehicle body through a rubber bush and the arm portions are coupled to suspension arms and the like of the suspension mechanism through a stabilizer bar link.

These suspension members including coiled springs and stabilizer bar are usually formed from a spring steel material, and antirust coatings are applied on their surfaces in order to further improve the antirust property. The antirust coating is usually constituted by an epoxy resin-based coating (see, for example, JP 2012-000530 A and WO 2014-013827 A).

BRIEF SUMMARY OF THE INVENTION

Technical Problem

However, in the case of the coiled spring, the epoxy resin-based coating, if applied alone, is broken in some cases due to the chipping phenomenon in cold districts. Moreover, when the epoxy resin-based coating of the end turn portion of the coiled spring is firmly brought into contact with the seat, the epoxy resin-based coating wears out or breaks by cracking, which may cause the advanced corrosion of the coiled spring, and result in early breakage thereby. Further, when grains of mud, sand and/or gravel enter the crevice between the end turn portion and a washer (spring seat), damaging of the epoxy resin-based coating is accelerated.

Further, in the case of the stabilizer bar, a mounting fixture of the stabilizer bar is provided with a rubber bush as described above. But in such a structure, grains of mud, sand and/or gravel are caught in the crevice between the stabilizer bar and rubber bush, which may damage these member.

Therefore, an object of the invention is to reinforce, in a vehicle suspension member having an epoxy rein-based coating, the protection of the epoxy resin-based coating itself, and the body of the suspension member underlying the coating, thereby solving the above-described drawbacks.

Means for Achieving the Object

According to the present invention, there is provided a vehicle suspension member comprising: a body of a vehicle suspension member made of a metal; a first layer which covers a surface of the body; a second layer which at least partially covers the surface of the first layer, wherein the first layer comprises an epoxy resin and the second layer comprises an epoxy resin and a fluororesin.

Advantage of the Invention

According to the present invention, the above-described drawback can be solved by further providing the second layer comprising an epoxy resin and a fluororesin (epoxy-fluororesin-based coating) on the first layer comprising an epoxy resin (epoxy resin-based coating) applied on the surface of a vehicle suspension member, so as to reinforce the protection of the epoxy resin-based coating and further the protection of the underlying suspension member body.

DETAILED DESCRIPTION OF THE INVENTION

Some embodiments of the present invention will be described below with reference to the accompanying drawings.

Figure 1:
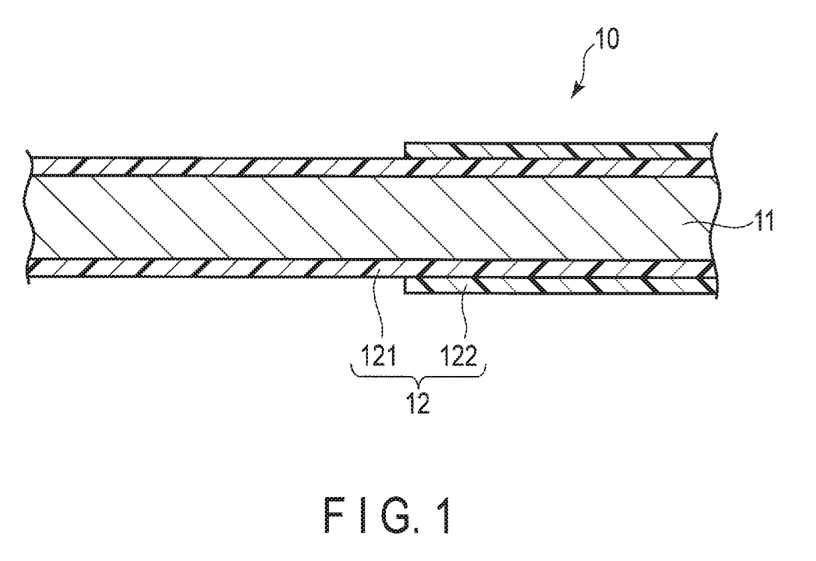
FIG. 1 is a schematic cross section illustrating an example of a basic structure of a suspension member of the present invention.

FIG. 1 is schematic cross section illustrating an example of a basic structure of a vehicle suspension member 10 according to the present invention.

The vehicle suspension member 10 illustrated in FIG. 1 comprises the body 11 of the suspension member and a protective film 12 which covers the surface of the body 11 of the suspension member.

The suspension member body 11 is a coiled spring (wire), a stabilizer bar, a flat spring, or the like, which constitutes a columnar, cylindrical or rectangular parallelepiped body (FIG. 1 shows a columnar body). The suspension member body 11 is formed from a metal, specifically, a steel material, or usually a spring steel material. The kind of spring steel is not particularly limited, but SAE 9254 may be mentioned, which is in conformity with the regulation of Society of Automotive Engineers (Society of Automotive Engineers) in the U.S.A. The ingredient composition of SAE 9254 (% by mass) is C: 0.51 to 0.59, Si: 1.20-1.60, Mn: 0.60-0.80, Cr: 0.60-0.80, and S: 0.040 at maximum, P: 0.030 at maximum and Fe: balance. Other examples of the steel material may include SUP 7 in conformity with the JIS standard and the like.

The steel material of the suspension member body 11 may comprise a chemical conversion layer (not shown) on a surface thereof. The chemical conversion layer can be formed of, for example, a phosphate such as zinc phosphate. Moreover, the steel material of the suspension member body 11 may be subjected to shot peening so as to improve the durability and anti-fatigue/fracture property by enhancing the surface hardening, equalizing the surface stress or imparting the residual compressive stress. If carried out, the shot peening is performed before the chemical conversion treatment.

The protective film 12, which is provided covering the surface of the suspension member body 11, comprises a first layer 121 directly covering the surface of the suspension member body 11 and a second layer 122 at least partially covering the surface of this first layer 121.

The first layer 121 comprises an epoxy resin. Glycidyl ether epoxy resin may be exemplified as the epoxy resin, and examples thereof are bisphenol A diglycidyl ether, bisphenol F diglycidyl ether and the like. These epoxy resins may be used singly or in mixture of two or more of these. It is preferred that the epoxy resin have an epoxy equivalent of 150-550. The epoxy resin can be cured by using, as a curing agent, such as a phenol (including a phenol resin such as novolac phenol resin), dicyandiamide or an acid hydrazide (for example, adipic acid dihydrazide, sebacic acid dihydrazide, isophthalic acid dihydrazide or dodecane dihydrazide). Thus, the first layer 121 may contain a phenol resin or other curing agent which cures the epoxy resin contained therein.

Alternatively, the first layer 121 may contain a polyester resin as a resin ingredient in addition to the epoxy resin. Examples of the polyester resin are those obtained by transesterification and polycondensation between a polyhydric alcohol such as ethylene glycol, diethylene glycol, methylene glycol, propanediol, butanediol, pentanediol or hexanediol, and a polybasic carboxylic acid such as terephthalic acid, maleic acid, isophthalic acid, succinic acid, adipic acid or sebacid acid. These polyester resins may be used singly or in mixture of two or more of these. The ratio between the epoxy resin and polyester resin may be 25-40:25-40 in mass ratio. The polyester resin may function also as a curing agent of the epoxy resin.

Thus, the resin component of the first layer 121 may consist of an epoxy resin, or of a mixture of an epoxy resin and a polyester resin. In this specification, the first layer may sometimes be referred to as an epoxy resin-based coating.

The first layer 121 may contain a filler such as calcium carbonate or talc, wax, and/or pigment (for example, carbon black).

An example of the epoxy resin composition for forming the first layer 121 contains 55 to 65% by mass of epoxy resin, 15 to 20% by mass of phenol resin (curing agent), 15 to 25% by mass of calcium carbonate, 1 to 2% by mass of wax and 0.6 to 1% by mass of carbon black. Another example of the epoxy resin composition which forms the first layer 121 contains 25 to 40% by mass of epoxy resin, 25 to 40% by mass of phenol resin (hardening agent), 15 to 25% by mass of calcium carbonate, 1 to 2% by mass of wax and 0.6 to 1% by mass of carbon black.

The first layer 121 preferably has a thickness of 30 to 100 µm in order to secure a sufficient corrosion resistance.

The second layer 122 formed to at least partially cover the surface of the first layer 121 comprises an epoxy resin and a fluororesin. As the epoxy resin, use may be made of the epoxy resin described in connection with the first layer 121. It is preferred that the epoxy resin used here be of the same type as that constitutes the first layer 121.

The fluororesin contained in the second layer 122 is preferably a tetrafluoroethylene-based fluororesin. Examples thereof are polytetrafluoroethylene (PTFE), polytetrafluoroethylene/hexafluoropropylene copolymer (FEP), and the like. These fluororesins exist in the form of fine particles (having an average particle diameter of 1 to 6 µm).

In the second layer, the epoxy resin and the fluororesin may be present at a mass ratio of 50 to 60:40 to 50. The resin component of the second layer may consist of an epoxy resin and a fluororesin, and therefore, in this specification, the second layer may sometimes be referred to as epoxy-fluororesin-based coating.

The second layer may contain a pigment (for example, titanium oxide) and other additives (for example, those described above).

An example of the epoxy-fluororesin composition for forming the second layer contains less than 10% by mass of PTFE fine particles, 10 to 30% by mass of FEP fine particles, 20 to 40% by mass of epoxy resin, 20 to 40% by mass of titanium oxide, and arbitrarily, less than 10% by mass of other additives. A curing agent may be unnecessary.

The second layer 122 preferably has a thickness of 20 µm or more in order to secure sufficient wear-proof property and slidability. The thickness of the second layer 122 is usually 20 µm or more but 50 µm or less.

In order to prepare the protective film 12, firstly, for example, the epoxy-based resin composition. (epoxy resin-based coating) described above is applied on the surface of the suspension member body 11 and cured by heating, thereby forming the first layer 121. In this case, if the suspension member body has been subjected to shot peening, the curing temperature is set at 230° C. or less in order not to abolish the advantageous effect exerted by the shot peening. The first layer is thus formed. Thereafter, its surface is degreased, the epoxy-fluororesin composition is sprayed thereon, which is then pre-dried and baked, thus forming the second layer 122. In this case, the pre-drying may be carried out, for example, at a temperature of 80 to 120° C. for 10 to 30 minutes. Moreover, if the suspension member body has been subjected to shot peening, similarly to the above, the baking temperature is set at 230° C. or less in order not to abolish the advantageous effect exerted by the shot peening. The baking may be carried out, for example, at a temperature of 180 to 220° C. for 20 to 40 minutes. By the baking, the epoxy resin is cured and the fluororesin particles are fused.

Figure 2:
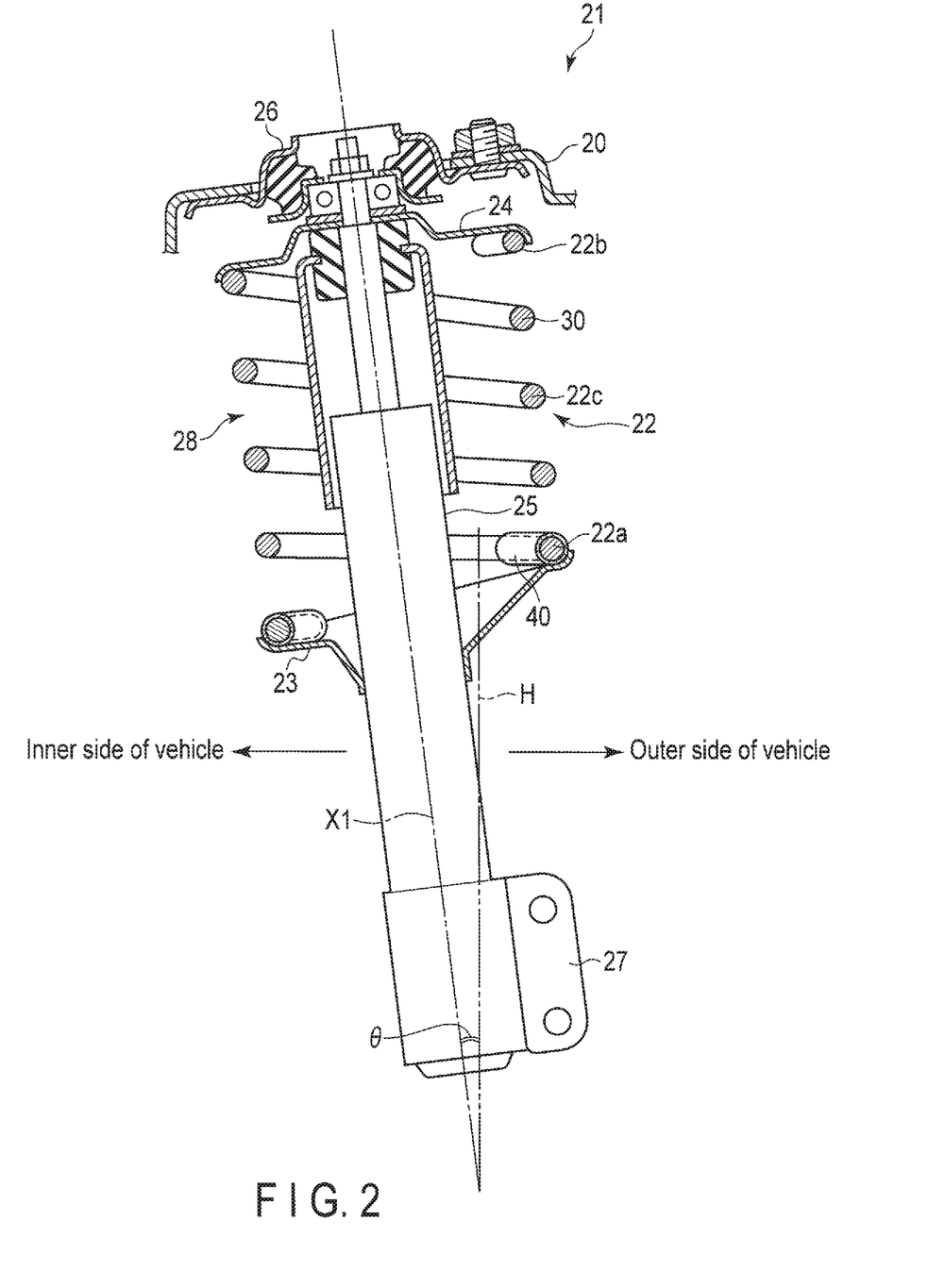
FIG. 2 is a longitudinal section of a suspension mechanism including a coiled spring according to an embodiment.

FIG. 2 shows an example of a vehicle suspension mechanism in which a coiled spring according to the embodiment of the present invention is incorporated. The suspension mechanism 21 is of a MacPherson Strut type provided in a vehicle body 20. The suspension mechanism 21 comprises a coiled spring (helical compression spring) 22, a lower spring seat 23 disposed at a lower side of the coiled spring 22, an upper spring seat 24 disposed at an upper side of the coiled spring 22, a shock absorber 25, a mount member 26 mounted to the vehicle body 20, a bracket 27 mounted to a knuckle member of the axle side, and the like.

The coiled spring 22 is disposed between the lower spring seat 23 and the upper spring seat 24 in a compressed state. The coiled spring 22 and the spring seats 23 and 24 constitute a spring device 28. The shock absorber 25 is mounted to the vehicle body 20 in such a posture that an axial line X1 is inclined to a vertical line H extending along an up-and-down direction by an angle θ.

Figure 3:
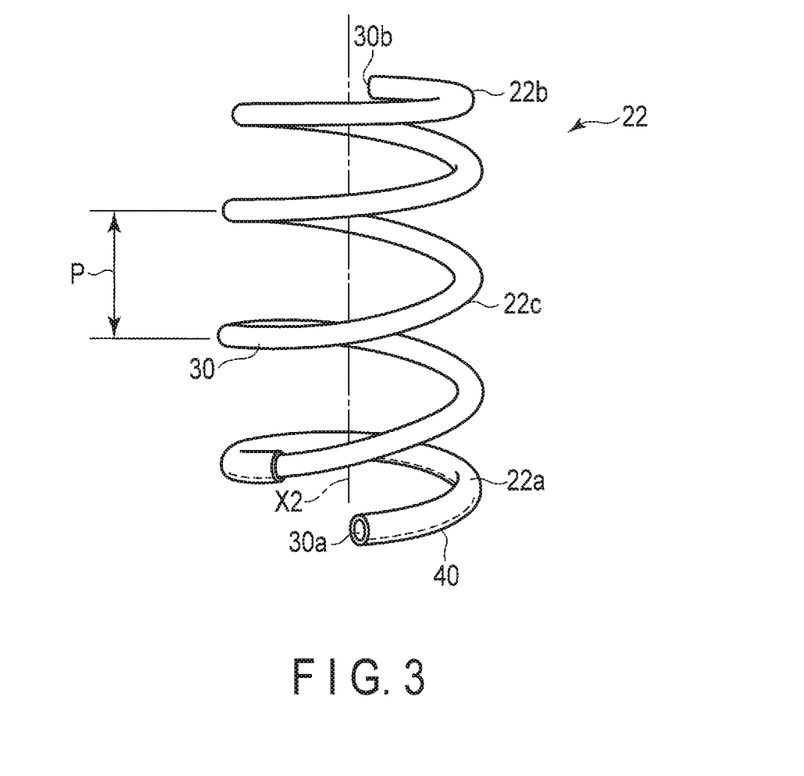
FIG. 3 is a perspective view of the coiled spring of the suspension mechanism illustrated in FIG. 2.

FIG. 3 shows the coiled spring 22 in a state where no compressive load is applied (so-called free state). The length of the coiled spring 22 along a direction of its central axis X2 in the free state is defined as free length. If a compressive load is applied along the central axis X2 of the coiled spring 22, the coiled spring 22 contracts along the direction to become shorter than its free length. The coiled spring 22 is mounted to the vehicle body 20 in an assembly state where it is compressed between the lower spring seat 23 and the upper spring seat 24.

As illustrated in FIG. 3, the coiled spring 22 comprises an element wire (wire) 30 formed into a helical shape. The wire 30 is a spring steel having a circular cross section and the entire outer surface of the element wire 30 is coated with an epoxy resin-based coating, not shown, (corresponding to the first layer 121 in FIG. 1) for anticorrosion. The coiled spring 22 comprises an upper end turn portion 22a formed, for example, before the first turn starting from the lower end 30a of the element wire 30 is completed, and a lower end turn portion 22b formed before the first turn starting from the upper end 30b of the element wire 30 is completed. An effective portion. 22c between the end turn portion 22b and 22a is rolled at a pitch P. An example of the coiled spring 22 is a cylindrical spring, but the spring 22 may be any one of various helical compression springs such as a barrel-shaped spring, an hourglass-shaped spring, a taper coiled spring, a variable pitch spring and other springs according to the specification of the vehicle.

An epoxy-fluororesin-based coating 40 (corresponding to the second layer 122 in FIG. 1) is provided, (partially) covering the circumferential surface of the epoxy resin-based coating portion on the wire 30 of the lower end turn portion 22a.

The coiled spring 22 is mounted to the vehicle body 20 in the state where it is compressed between the lower spring seat 23 and the upper spring seat 24, so as to elastically support the load applied onto the vehicle body 20. The lower end turn portion 22a is in contact with the top surface of the spring seat 23. The upper end turn portion 22b is in contact with the bottom surface of the spring seat 24. The coiled spring 22 is expanded at, the maximum when fully rebounded and compressed at the maximum when fully bumped. The term "full rebound" refers to the state which the coiled spring 22 is expanded at the maximum by a tensile load applied to the coiled spring 22 downward when the vehicle body is lifted. The term "full bump" refers to the state where the coiled spring 22 is compressed at the maximum by a load applied to the vehicle body 20.

The coiled spring 22 is attached to the shock absorber 25 in a preloaded state where compressed between the spring seats 23 and 24, and then amounted to the vehicle body 20. A load along an up-and-down direction is applied to the coiled spring 22 mounted to the vehicle body 20. According to the weight of the load, the coiled spring 22 contorts between the lower spring seat 23 and the upper spring seat 24. That is, the coiled spring 22 is expanded and contracted between the full bump (the maximum compression state) and the full rebound (the maximum expansion state) according to the weight of the load.

As the coiled spring 22 expands, the crevice between the spring seat 23 and the lower end turn portion 22a opens further, into which a foreign substance such as sand may enter. On the contrary, if the coiled spring 22 is compressed, the crevice between the spring seat 23 and the lower end turn portion 22a becomes narrow. As a result, if a hard foreign substance such as sand enters between the lower end turn portion 22a and the element wire 30, the epoxy resin-based coating of the coiled spring 22 may be peeled off or the wire 30 may be damaged, which may cause corrosion in the wire 30 and/or early breakage which starts from a surface crack. Moreover, the chipping resistance at low temperature may also degrade.

However, in this embodiment, the epoxy-fluororesin-based coating 40 is formed to cover the epoxy resin-based coating portion of the wire 30 in the lower end turn portion 22a. With this structure, an end turn portion of the coiled spring is in contact with a mating portion (spring seat) to prevent the wear-out phenomenon of the epoxy resin-based coating or the wire. Further, the corrosion of the wire 30, which may be caused by the entering of a foreign substance such as sand between the spring seat 23 and the element wire 30, can be inhibited. Therefore, the breakage of the wire 30, which may be caused by corrosion, can be suppressed, thereby making it possible to enhance durability. One possible cause therefor is that the fluororesin contained in the second layer is low frictional, and has high wear-out resistance.

Here, in the example described above, the epoxy-fluororesin-based coating 40 is formed on the lower end turn portion 22a, but the present invention is not limited to this example. The epoxy-fluororesin-based coating 40 may be formed on the upper end turn portion 22b or even on the entire wire 30.

Figure 4:
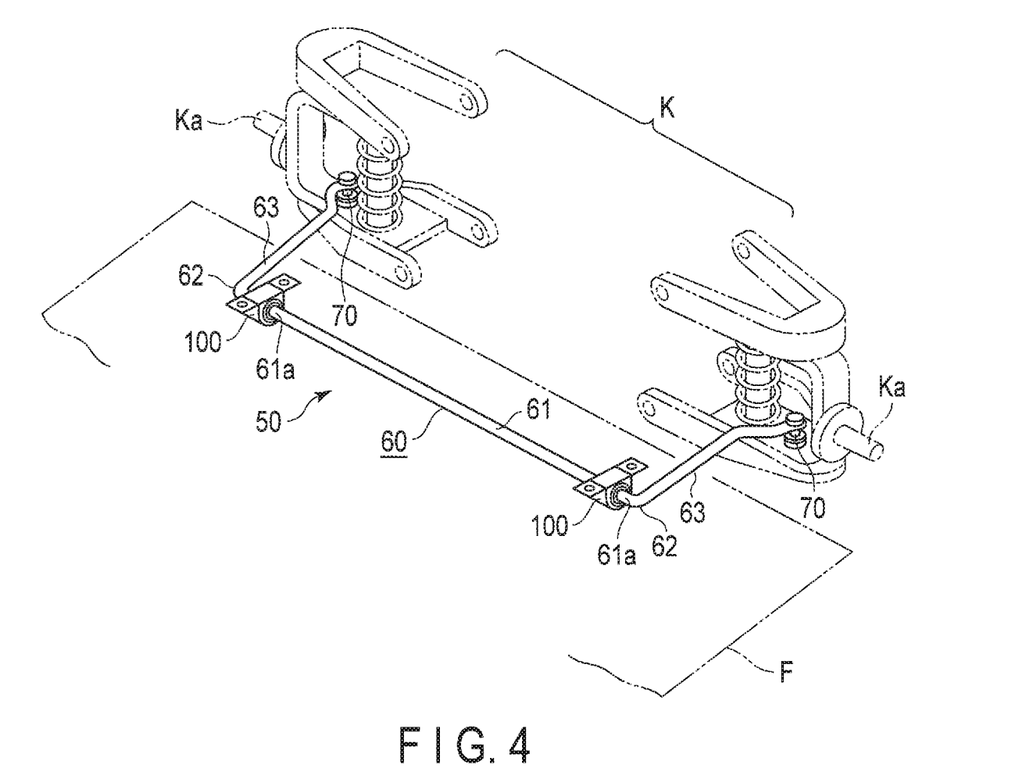
FIG. 4 is a perspective view illustrating the suspension device of front wheels of the vehicles, provided with a vehicle stabilizer bar according to an embodiment.
Figure 5:
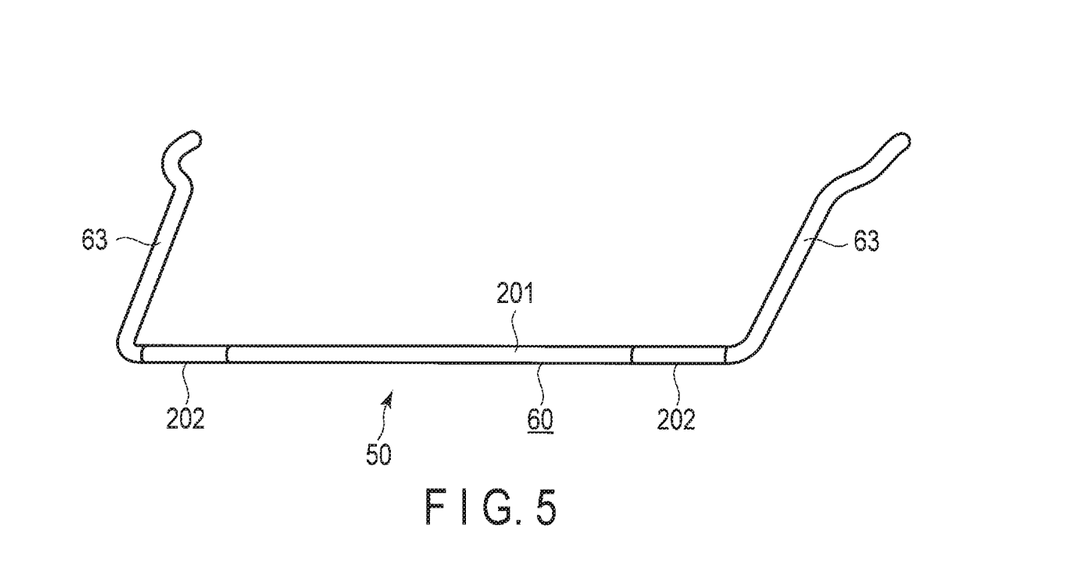
FIG. 5 is a perspective view illustrating the stabilizer bar illustrated in FIG. 4, excluding the bush.

FIG. 4 illustrates an example of a vehicle suspension mechanism K in which a stabilizer according to an embodiment of the present invention is mounted. FIG. 5 is a perspective view showing a vehicle stabilizer 50 in the state stabilizer bushes 100 are removed.

The vehicle stabilizer 50 comprises a stabilizer bar 60 formed from a hollow or solid member, stabilizer bushes 100 which fix the stabilizer bar 60 to a frame F of the vehicle body, and stabilizer links 70 which couple tip ends 63a of the stabilizer bar 60 with the operation portions of the suspension mechanism K.

The stabilizer bar 60 comprises a torsion portion 61 provided to bridge along the width direction of the vehicle body, shoulder portions 62 located respectively on both ends of the torsion portion 61, and arm portions 63 extending along a forward-and-backward direction of the vehicle, respectively, from the shoulder portions 62, and is formed approximately into a U shape.

The stabilizer bar 60 has a function of stably holding the suspension system K by torsion reaction force against the torsion created at the torsion portion 61 by the arm portions 63 operating following the up-and-down movement of the operation portion of the suspension system K. The cross section of the stabilizer bar 60 may be circular.

The suspension mechanism K is, for example, a double-wishbone type suspension mechanism and includes axle portions Ka provided at right and left sides thereof, to which front wheels and the like (not shown) are mounted.

As illustrated in FIG. 5, on the entire surface of the stabilizer bar 60, an epoxy resin-based coating 201 (corresponding to the first layer 121 in FIG. 1) may be provided. Then, epoxy-fluororesin-based coatings are formed on the epoxy resin-based coating 201. Here, it is advantageous to form the epoxy-fluororesin-based coating on the circumferential surfaces of the portions of the stabilizer bar 60, which are brought into contact with the bushes 100 when it is mounted (epoxy-fluororesin-based coatings 202).

As described above, the bushes 100 are mounted on predetermined positions of the stabilizer 50, which are coated with the epoxy resin-based coating 201 and further the epoxy-fluororesin-based coating 202.

The vehicle stabilizer bar 50 constituted as above operates as follows. That is, suppose that, for example, during the vehicle is traveling, a wheel run into a pothole and one side of the suspension system K lowers. Thus, a nip angle is created between the right and left arm portions 63, or the nip angle expands to twist the torsion portion 61, by which a torsion reaction force is generated. Due to the torsion reaction force, the torsion portion 61 restores the original state to place the suspension mechanism K back to the original position.

During the above-described operation, grains of mud, sand and/or gravel may enter a crevice between the stabilizer bar 60 and the bush 100 to cause damage on the epoxy coating and the bush 100. However, as described above, the epoxy-fluororesin-based coating 202 is formed on the epoxy resin-based coating 201 between the stabilizer bar 60 and the bush 100, and therefore such a damage can be prevented. In addition, with the epoxy-fluororesin-based coating 202, noise caused by friction between the stabilizer bar 60 and the bush 100 can be prevented or reduced.

Heretofore, the embodiments wherein the coating of the present invention is applied on the coiled spring and the stabilizer bar as vehicle suspension members have been described, but the present invention is applicable also to other vehicle suspension members. For example, another embodiment of the present invention may be a suspension mechanism in which a flat spring is built. When the epoxy-fluororesin-based coating of the present invention is formed on a flat spring, biting of hard foreign matters of, for example, sand and gravel, can be prevented. As a result, corrosion or breakage, which may be caused by collision, can be prevented, and therefore the durability can be improved. Moreover, the occurrence of noise caused by friction between flat springs can be prevented or reduced, which is another advantageous effect. Furthermore, the increase in the coefficient of dynamic friction in a minute frequency band can be prevented, and therefore it is possible to improve the riding comfort especially traveling on a highway where small vibrations are continuously generated.

EXAMPLES

The present invention will be described by way of Examples below.

Example

An entire outer circumferential surface of a stabilizer bar having a diameter of 23 mm and formed of SUP 9 was powder-coated with an epoxy resin composition of the ingredients specified below, which was then baked in the atmosphere at 180° C. for 20 minutes. Thus, an epoxy resin-based coating having a thickness of 80 to 120 μm was formed.

<Epoxy Resin Composition>
Epoxy resin (bisphenol A diglycidyl ether/bisphenol F diglycidyl ether copolymer) 57-63% by mass;
Curing agent (glycidyl terminal cap poly (bisphenol A/epichlorohydrin: CAS No. 25036-25-3) 18-20% by mass;
Calcium carbonate 18-25% by mass; and
Black pigments (carbon black) 0.8-1.0% by mass.

An epoxy-fluororesin composition of the ingredients specified below was applied to predetermined portions of the epoxy resin-based coating, which was then dried at 100° C. for 20 minutes and baked at 200° C. for 20 minutes, forming an epoxy-fluororesin-based coating having a thickness of 40 to 60 μm and a width of 100±5 mm.

<Epoxy-Fluororesin Composition>
Epoxy resin (bisphenol A diglycidyl ether/bisphenol F diglycidyl ether/polyester copolymer) 25-35% by mass;
PTFE fine particles 5-10% by mass;
FEP fine particles 15-25% by mass; and
Titanium oxide 25-35% by mass.

Bushes made of ethylene-propylene-diene rubber were attached to cover the epoxy-fluororesin-based coating.

Figure 6:
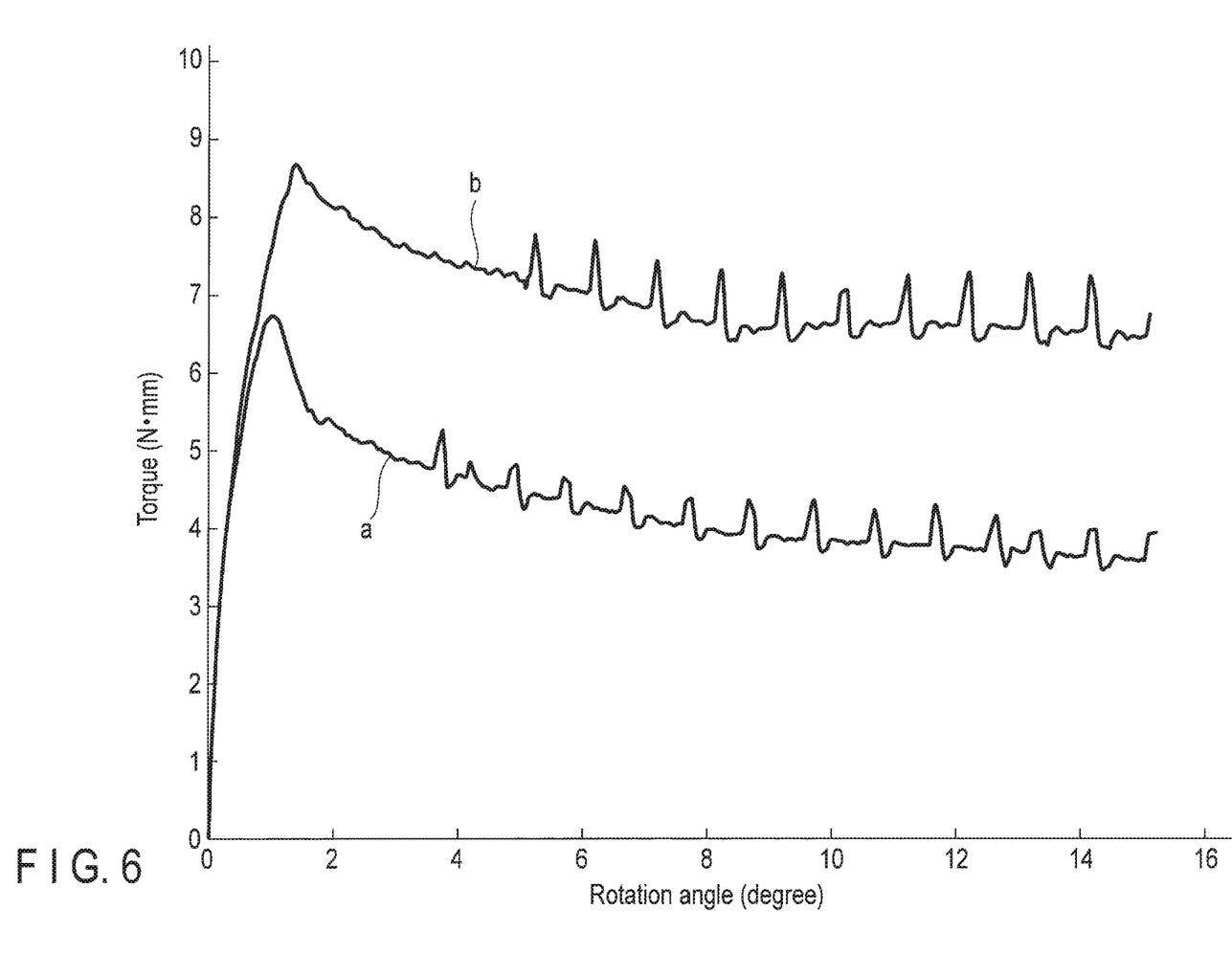
FIG. 6 is a graph showing the measured values of torque of the stabilizer bar of the present invention together with that of a comparative example.

Thereafter, the bushes were fixed, the both ends of the stabilizer bar were twisted in the same rotating direction at a rotating speed of 0.5 degree per second, and the torque was measured at various rotation angles. A stabilizer bar not coated with the epoxy-fluororesin-based coating was similarly measured in terms of torque. The results are shown in FIG. 6. In FIG. 6, curve a indicates the results for the stabilizer bar coated with the epoxy-fluororesin-based coating, whereas curve b indicates the results for the stabilizer bar with no epoxy-fluororesin-based coating armed thereon.

As can be seen from the results shown in FIG. 6, the stabilizer bar coated with the epoxy-fluororesin-based coating exhibited significantly lower torque values as compared to the stabilizer bar with no epoxy-fluororesin-based coating formed thereon. The results indicate that the stabilizer bar coated with the epoxy-fluororesin-based coating had less friction with respect to the bushes, and secure wear-proof property and slidability are sufficiently secured, suggesting that noise caused by the friction between the stabilizer bar and the bushes can be prevented or reduced. Moreover, the stabilizer bar coated with the epoxy-fluororesin-based coating is low in coefficient of friction, and therefore grains of mud, sand and/or gravel cannot easily enter crevices between the stabilizer bar and the bushes. Consequently, it is expected that the underlying epoxy coating and the bush can be prevented from damage.

What is claimed is:

1. A vehicle suspension member comprising:
   a body of a vehicle suspension member, the body being made of a metal;
   a first layer provided to cover a surface of the body; and
   a second layer provided to cover at least a portion of a surface of the first layer,
   wherein the first layer comprises an epoxy resin,
   wherein the second layer comprises an epoxy resin and a fluororesin at a mass ratio of 50 to 60:40 to 50, and
   wherein the fluororesin in the second layer is in the form of fine particles having an average particle diameter of 1 to 6 μm.

2. The vehicle suspension member of claim 1, wherein the epoxy resins which the first layer and the second layer comprise, respectively, each have an epoxy equivalent of 150 to 550, respectively.

3. The vehicle suspension member of claim 1, wherein the first layer contains a phenol resin as a curing agent which cures the epoxy resin.

4. The vehicle suspension member of claim 3, wherein the first layer contains 55 to 65% by mass of the epoxy resin, 15 to 20% by mass of the phenol resin as the curing agent, 15 to 25% by mass of calcium carbonate, 1 to 2% by mass of wax and 0.6 to 1% by mass of carbon black.

5. The vehicle suspension member of claim 1, wherein the first layer further contains a polyester resin.

6. The vehicle suspension member of claim 5, wherein the first layer contains the epoxy resin and the polyester resin at a mass ratio of 25 to 40:25 to 40.

7. The vehicle suspension member of claim 5, wherein the first layer contains 25 to 40% by mass of the epoxy resin, 25 to 40% by mass of the polyester resin, 15 to 25% by mass of calcium carbonate, 1 to 2% by mass of wax, and 0.6 to 1% by mass of carbon black.

8. The vehicle suspension member of claim 1, wherein the first layer has a thickness of 30 to 100 μm.

9. The vehicle suspension member of claim 1, wherein the fluororesin is at least one selected from the group consisting of polytetrafluoroethylene (PTFE) and tetrafluoroethylene/hexafluoropropylene copolymer (FEP).

10. The vehicle suspension member of claim 9, wherein the second layer contains less than 10% by mass of PTFE particles, 10 to 30% by mass of FEP particles, 20 to 40% by mass of the epoxy resin and 20 to 40% by mass of titanium oxide.

11. The vehicle suspension member of claim 1, wherein the second layer has a thickness of 20 to 50 μm.

12. The vehicle suspension member of claim 1, wherein the body has been subjected to a shot peening process.

13. The vehicle suspension member of claim 1, wherein the body comprises a chemical conversion layer on a surface thereof.

14. The vehicle suspension member of claim 1, wherein the body is a coiled-spring member, and the second layer is provided on at least an end turn portion.

15. The vehicle suspension member of claim 1, wherein the body is a stabilizer member, and the second layer is provided on at least a portion on which a bush is mounted.

* * * * *